United States Patent [19]

Buckley

[11] 4,045,047
[45] Aug. 30, 1977

[54] ONE-WAY BRAKE FOR WHEEL CHAIRS

[76] Inventor: Clair S. Buckley, Main St., Emlenton, Pa. 16373

[21] Appl. No.: 618,036

[22] Filed: Sept. 30, 1975

[51] Int. Cl.$^2$ .............................................. B62M 1/14
[52] U.S. Cl. ............................ 280/242 WC; 188/82.2
[58] Field of Search .......... 280/242 WC, 242 R, 249, 280/250, 5.2; 188/2 F, 82.84, 82.2, 82.9, 82.1, 82.8; 192/45

[56] References Cited

U.S. PATENT DOCUMENTS

| | | | |
|---|---|---|---|
| 2,667,945 | 2/1954 | Caldeira | 188/2 F |
| 2,834,239 | 5/1958 | Mancini | 192/45 X |
| 2,973,838 | 3/1961 | Oswold | 188/82.2 |
| 3,017,964 | 1/1962 | Von Thuengen | 192/45 |
| 3,226,129 | 12/1965 | McKinley | 188/82.9 X |
| 3,259,396 | 7/1966 | Zamotin | 280/242 WC |
| 3,529,700 | 10/1968 | Marshall | 188/2 F |
| 3,750,593 | 8/1973 | Zetterlund | 188/82.84 X |
| 3,827,718 | 8/1974 | Curry | 280/242 WC |

*Primary Examiner*—Joseph F. Peters, Jr.
*Assistant Examiner*—Terrance L. Siemens

[57] ABSTRACT

A wheel chair having small front wheels and large rear wheels supported on axles is disclosed. A ratchet connects each rear wheel to the axle so that each wheel can rotate in a single direction thereby enabling a patient to move his wheel chair up an incline in intervals without having the chair roll backward. A person riding up a ramp in a wheel chair will be able to move himself along by moving the wheels by intermittant forces of his hands on the rear wheels and the chair will not roll backward at the times between the forces. With the ordinary wheel chair, an individual trying to force himself up a ramp may push the chair forward by force, but must hold the chair in this position before again pushing it, thus making it difficult to move himself up the ramp in the chair.

1 Claim, 4 Drawing Figures

ONE-WAY BRAKE FOR WHEEL CHAIRS

REFERENCE TO PRIOR ART

U.S. Pat. No. 3,529,700 shows a brake mechanism for a wheel chair wherein a hand controllable lever engages the tires of a wheel chair to smultaneously hold them against rotation.

U.S. Pat. No. 2,667,945 shows a brake which may be inserted between the spokes of the wheels of the wheel chair to hold the chair in parked position.

U.S. Pat. No. 3,827,718 shows a wheel chair having caster wheels at the front. The caster wheels are provided with a ratchet to facilitate going down stairs with them.

OBJECTS OF THE INVENTION

It is an object of the invention to provide an improved wheel chair and ratchet combination.

Another object of the invention is to provide the combination one way clutches in combination with the large propelling wheels of a wheel chair.

Another object of the invention is to provide an improved combination wheel chair and ratchet arrangement for the propelling wheels of a wheel chair.

With the above and other objects in view, the present invention consists of the combination and arrangement of parts hereinafter more fully described, illustrated in the accompanying drawing and more particularly pointed out in the appended claims, it being understood that changes may be made in the form, size, proportions, and minor details of construction without departing from the spirit or sacrificing any of the advantages of the invention.

GENERAL DESCRIPTION OF DRAWINGS

DETAILED DESCRIPTION OF DRAWINGS

Figure 1:
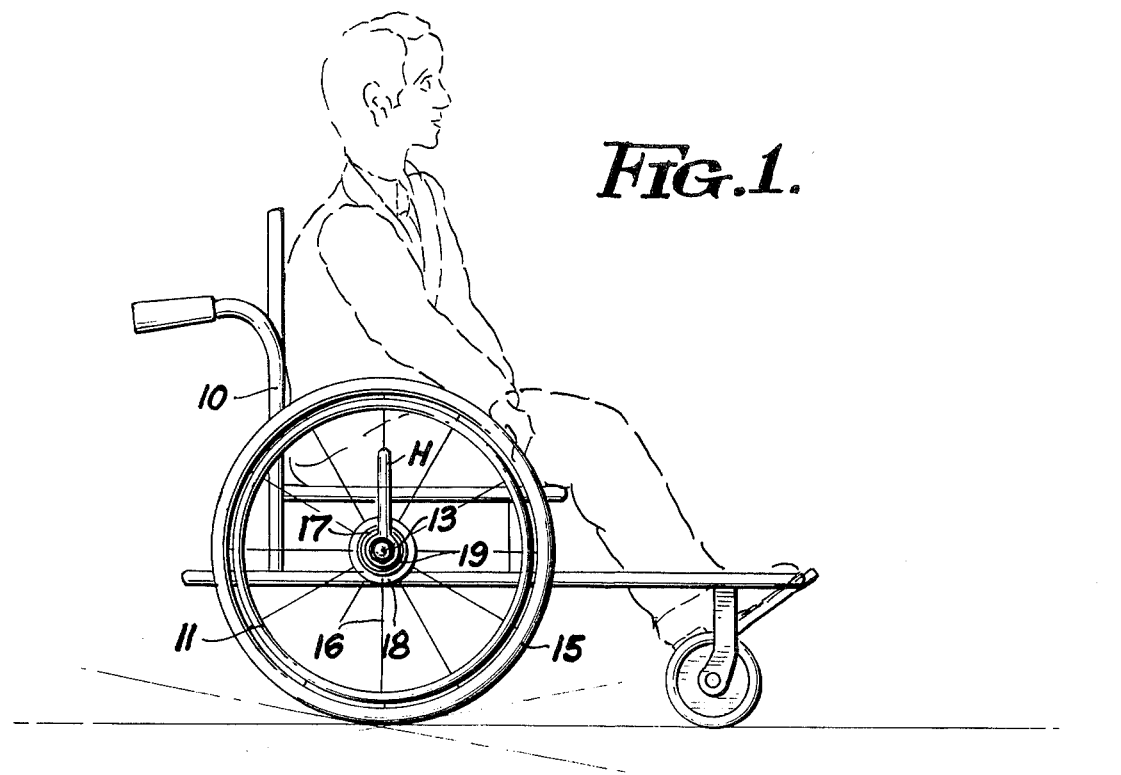
FIG. 1 is a side view of a wheel chair, according to the invention.

Now with more particular reference to the drawing, the wheel chair is shown with a frame 10 and propelling wheels 11, and caster wheels 12. Frame 10 has axles 13 fixed to it and axles 13 receive the hubs 14 of the wheels 11. The wheels 11 have spokes 16 and tires 15.

Figure 2:
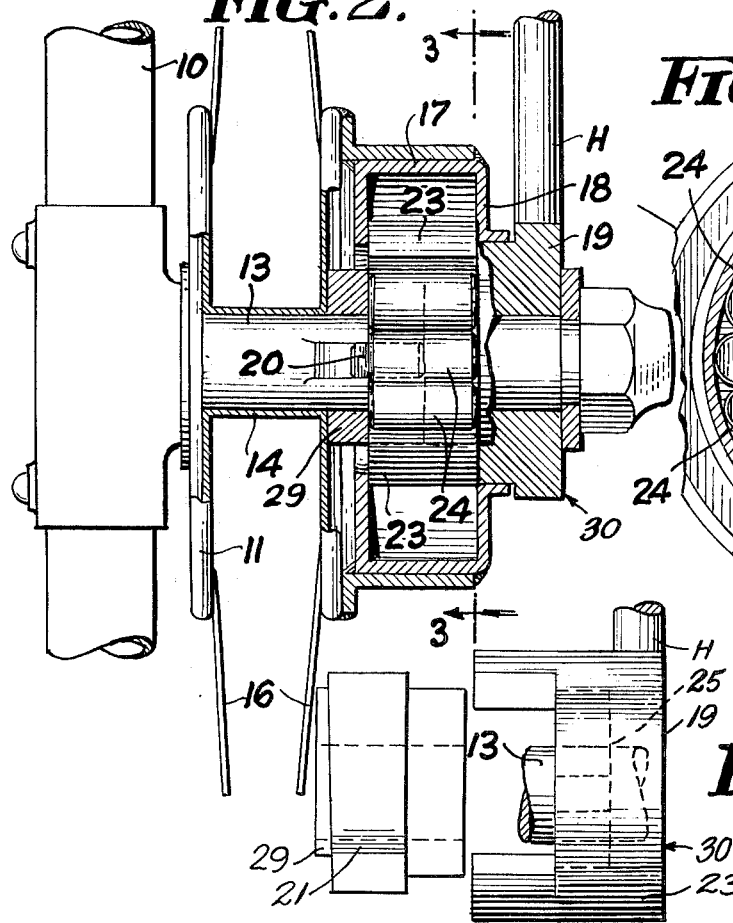
FIG. 2 is a cross sectional view taken on line 2—2 of FIG. 1.
Figure 3:
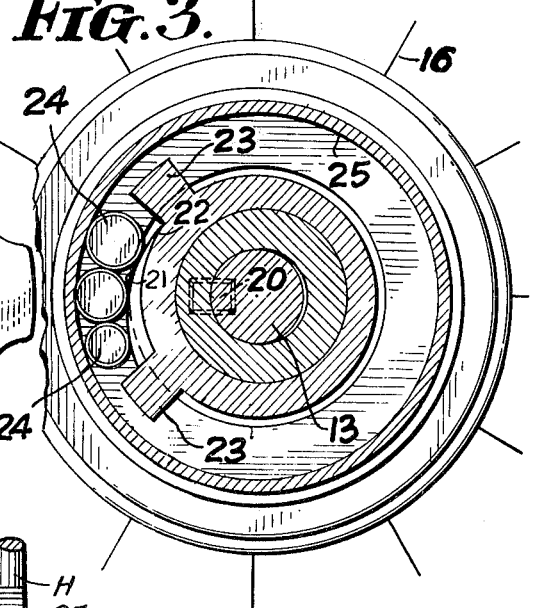
FIG. 3 is a cross sectional view taken on line 3—3 of FIG. 2.
Figure 4:
FIG. 4 is a cross sectional view taken on line 4—4 of FIG. 2.

Fixed to the hub 14 of the wheels 11 are the outer rotatable members 17 of the clutches 18. The clutches 18 are of a type familiar in friction drive wrenches, having a engaged position and a positon where the clutch is totally disengaged. The clutches 18 have an inner member 19 which has a part which is fixed to the axle 13 by means of the key 20. The outer periphery of the inner member 19 has a cam surface 21 which has a minor radius portion 22 adjacent the stop 23. The member 29 extends approximately half way along the rollers 24 and terminates approximately at the dotted line shown at 25 in FIG. 2. The stops 23 are fixed to member 19 and rotate with it and they extend axially so that member 19 can rotate on axle 13 and stops 23 engage the rollers 24 along their entire length when lever H is moved forward. When the lever H is moved rearward, stops 23 are moved away from rollers 24 and they cooperate with cam surface 21 to allow the wheels to rotate in one direction only. The rollers 24 are supported between the cam surfaces 21 and the inner periphery 25 of the outer member 17. Thus, it will be seen that when the wheel rotates in a backward direction, the inner periphery 25 of the outer member 17 will cause the rollers 24 to roll up the incline 21, locking the inner member 19 to the outer member 17 and thereby locking the wheel 11 to prevent it from rotating backward. The wheel will be free to rotate forward since when the outer clutch member is rotated in a clockwise direction, the rollers will be rotated away from the cam surface 21.

The handle H is fixed to the outer part of the member 30 and member 30 can rotate with handle H a limited amount. Member 30 carries stops 23 which are spaced from each other at a slightly greater distance than the space occupied by rollers 24. The rollers 24 are held away from moving into engaged position with the cam surface 21. When the handle H is moved rearward, the rollers are not affected by the stops 23 and they can move into clamping position between the cam surface 21 and the inner periphery 25. When the handle H is moved in a rearward direction, the stop 23 will engage the rollers, preventing them from moving up the incline 21 on the inner part of member 19. Thus, with the handle H in forward position, the user can grasp the outer periphery of the wheels with his hands and rotate the wheels forward to propel the wheel chair up an incline. This will rotate the rollers forward along the cam surface 21 so that the main wheels 11 are free to rotate. When the operator releases the force on the wheels and the chair tries to run backward, the outer periphery 29 of the cam member will rotate in a counter clockwise direction causing the rollers 24 to bind between the surface 21 and the inner periphery 25 of the outer member 17. Thus, the one way clutches can be disabled so that the chair may move about unaffected by the the clutches, or, the clutches can be activated so that the chair will move forward only.

The foregoing specification set forth the invention in its preferred practical forms but the structure shown is capable of modification within a range of equivalents without departing from the invention which is to be understood is broadly novel as is commensurate with the appended claims.

The embodiments of the invention is which an exclusive property or privilege is claimed are defined as follows.

1. In combination, a wheel chair having a frame, and two main wheels, each with a hub and a friction drive supported on axles and adapted to allow the chair to move forward but not backward, said axles being fixed to said frame and, said friction drive having an inner member and an outer member, said inner member of said friction drive being fixed to said axle and, the said outer member of said friction drive being fixed to said hub, cam means on said inner member, roller means between said outer member and said cam means, said roller means being adapted to be moved into clamping contact between said cam means and said outer clutch member when the chair is moved in a rearward direction, but to allow the chair to move freely forward whereby said chair can be moved freely forward up an incline but will not run backwards, stop members, handle means supported on said axle connected to said stop members for rotating said stop members whereby said roller means is held away from said cam means in unactuated position and said chair may be moved freely in both a forward and a rearward direction.

* * * * *